(12) United States Patent
Penn et al.

(10) Patent No.: US 11,679,860 B2
(45) Date of Patent: Jun. 20, 2023

(54) ACOUSTIC ABATEMENT PANEL FABRICATION

(71) Applicant: The NORDAM Group LLC, Tulsa, OK (US)

(72) Inventors: Timothy Dustin Penn, Tulsa, OK (US); Matthew Shaun Fritz, Bixby, OK (US); Jane Alice Benbenek, Owasso, OK (US)

(73) Assignee: The NORDAM Group LLC, Tulsa, OK (US)

( * ) Notice: Subject to any disclaimer, the term of this patent is extended or adjusted under 35 U.S.C. 154(b) by 86 days.

(21) Appl. No.: 17/494,994

(22) Filed: Oct. 6, 2021

(65) Prior Publication Data
US 2022/0024555 A1 Jan. 27, 2022

Related U.S. Application Data

(62) Division of application No. 16/108,494, filed on Aug. 22, 2018, now Pat. No. 11,180,237.
(Continued)

(51) Int. Cl.
*B64C 1/40* (2006.01)
*B32B 7/12* (2006.01)
(Continued)

(52) U.S. Cl.
CPC .............. *B64C 1/40* (2013.01); *B29C 66/727* (2013.01); *B29C 66/72525* (2013.01);
(Continued)

(58) Field of Classification Search
CPC ............ B32B 2307/50; B32B 2250/05; B32B 2305/024; B29C 44/186
See application file for complete search history.

(56) References Cited

U.S. PATENT DOCUMENTS 3,944,704 A * 3/1976 Dirks ...................... B29C 44/10
156/313
4,265,955 A 5/1981 Harp et al.
(Continued)

FOREIGN PATENT DOCUMENTS

JP 08258189 A * 10/1996 ............. B29C 65/48

OTHER PUBLICATIONS

Machine translation of JPH08258189 (Year: 1996).*
(Continued)

*Primary Examiner* — Scott W Dodds
(74) *Attorney, Agent, or Firm* — Francis L. Conte

(57) ABSTRACT

A method of making an aircraft acoustic structural panel (10) begins with preforming a core honeycomb laminate (12) having preformed foam (3) bonded inside cells (14) thereof by a distinct adhesive (2). The preformed honeycomb laminate (12) is then stacked between opposite top and bottom structural outer laminates (16,18). The stacked honeycomb laminate (12) and outer structural laminates (16,18) are then compressed together under heat and pressure into a unitary structural panel (10) having the core honeycomb laminate (12) integrally bonded between outer skins (20,22). The outer laminates (16,18) may include imperforate acoustic septums (4) bounding the core honeycomb laminate (12) followed by an outer honeycomb (5) and structural fiber layers (6, 7, 8) defining the outer skins (20,22).

20 Claims, 4 Drawing Sheets

Related U.S. Application Data

(60) Provisional application No. 62/555,320, filed on Sep. 7, 2017.

(51) Int. Cl.

| | | |
|---|---|---|
| *B32B 5/18* | (2006.01) | |
| *B32B 5/12* | (2006.01) | |
| *B32B 15/04* | (2006.01) | |
| *B32B 15/14* | (2006.01) | |
| *B32B 15/20* | (2006.01) | |
| *G10K 11/168* | (2006.01) | |
| *B32B 3/12* | (2006.01) | |
| *B32B 37/12* | (2006.01) | |
| *B29C 65/00* | (2006.01) | |
| *B32B 37/14* | (2006.01) | |
| *B32B 38/00* | (2006.01) | |
| *B64C 1/00* | (2006.01) | |
| *B29C 44/18* | (2006.01) | |

(52) U.S. Cl.
CPC .............. *B32B 3/12* (2013.01); *B32B 5/12* (2013.01); *B32B 5/18* (2013.01); *B32B 7/12* (2013.01); *B32B 15/046* (2013.01); *B32B 15/14* (2013.01); *B32B 15/20* (2013.01); *B32B 37/12* (2013.01); *B32B 37/146* (2013.01); *B32B 38/0004* (2013.01); *G10K 11/168* (2013.01); *B29C 44/186* (2013.01); *B29C 66/72523* (2013.01); *B32B 2260/023* (2013.01); *B32B 2260/046* (2013.01); *B32B 2262/106* (2013.01); *B32B 2266/0214* (2013.01); *B32B 2305/022* (2013.01); *B32B 2305/024* (2013.01); *B32B 2307/102* (2013.01); *B32B 2307/50* (2013.01); *B32B 2605/18* (2013.01); *B64C 2001/0072* (2013.01)

(56) References Cited

U.S. PATENT DOCUMENTS

| | | |
|---|---|---|
| 4,271,219 A | 6/1981 | Brown |
| 4,294,329 A | 10/1981 | Rose et al. |
| 4,336,292 A | 6/1982 | Blair |
| 4,421,811 A | 12/1983 | Rose et al. |
| 4,465,725 A | 8/1984 | Riel |
| 4,475,624 A | 10/1984 | Rourland, Jr. et al. |
| 4,541,879 A | 9/1985 | Riel |
| 4,687,691 A | 8/1987 | Kay |
| 4,964,936 A | 10/1990 | Ferro |
| 5,041,323 A | 8/1991 | Rose et al. |
| 5,106,668 A | 4/1992 | Turner et al. |
| 5,188,879 A | 2/1993 | Hill |
| 5,338,594 A | 8/1994 | Wang et al. |
| 5,445,861 A | 8/1995 | Newton |
| 5,460,864 A | 10/1995 | Heitkamp |
| 5,460,865 A | 10/1995 | Tsotis |
| 5,518,796 A | 5/1996 | Tsotsis |
| 5,667,866 A | 9/1997 | Reese, Jr. |
| 6,183,837 B1 | 2/2001 | Kim |
| 6,203,656 B1 | 3/2001 | Syed |
| 8,540,921 B2 | 9/2013 | Senibi et al. |
| 9,640,166 B2 | 5/2017 | Simon et al. |
| 9,643,392 B2 | 5/2017 | Butler et al. |
| 9,693,166 B2 | 6/2017 | Herrera et al. |
| 9,741,331 B1 | 8/2017 | Alam et al. |
| 2006/0000186 A1 | 1/2006 | Carlson et al. |
| 2018/0251205 A1 | 9/2018 | Leblanc et al. |

OTHER PUBLICATIONS

BASF Aerospace Materials, "Divinycell F, Core Materials Made From Ultrason," 2012, 4-page brochure, WWW.Aerospace.BASF.com, Florham Park, New Jersey, USA.

Matweb LLC, "Diab Divinycell F 50 Sandwich Core Material," Jun. 13, 2018, 3-page Material Description, WWW.MatWeb.com, Blacksburg, Virginia, USA.

Diab Group, "Divinycell F, The High Performance Sandwich Core," Jul. 2016, 4-page Material Description, WWW.DiabGroup.com, Laholm, Sweden.

Diab Group, "Divinycell H, The High Performance Sandwich Core," Jul. 2018, 4-page Material Description, WWW.DiabGroup.com, Laholm, Sweden.

Plascore Incorporated, "PK2 Kevlar N636 Para-Aramid Fiber Honeycomb," Jun. 19, 2018, 4-page Material Description, WWW.Plascore.com, , Zeeland, Michigan, USA.

\* cited by examiner

ACOUSTIC ABATEMENT PANEL FABRICATION

BACKGROUND OF THE INVENTION

The present invention relates generally to aircraft construction, and, more specifically, to noise suppression therein.

Commercial aircraft typically have large cabins for maximizing passenger carrying capability, and it is a paramount objective to minimize noise during aircraft flight for passenger comfort.

Aircraft noise, or sound, is generated during operation from articulation of the landing gear or flaps, engine operation, lavatories, and other sources and can be objectionable to the passengers.

Sandwich panel construction methods are used extensively throughout aircraft manufacturing for interior cabinets, flooring, sidewalls, stowage bins, and other components.

A composite sandwich panel typically includes inner and outer skins with a lightweight core adhered between the skins. This forms a stiff and strong structural panel with correspondingly little weight. This sandwich construction is utilized throughout aircraft manufacturing, but has limited or no acoustic abatement effectiveness, and can even promote transmission of undesirable noise.

Many original equipment manufacturers (OEMs), or airframers, and their customer Airlines seek to reduce noise transmission throughout the cabin by typically adding sound attenuation features to various aircraft components including the walls, floors, and cabinets.

Adding noise abatement features can therefore increase the complexity, cost, and weight of an aircraft, and may even reduce available space for passengers and cargo.

Accordingly, it is desired to provide an improved aircraft structural panel having inherent sound attenuation features while minimizing associated complexity, cost, and weight.

BRIEF DESCRIPTION OF THE INVENTION

A method of making an aircraft acoustic structural panel begins with preforming a core honeycomb laminate having preformed foam bonded inside cells by a distinct adhesive. The core laminate is then stacked between opposite top and bottom structural outer laminates. The stacked core laminate and outer laminates are then compressed together under heat and pressure into a unitary structural panel having the core laminate integrally bonded between outer skins.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
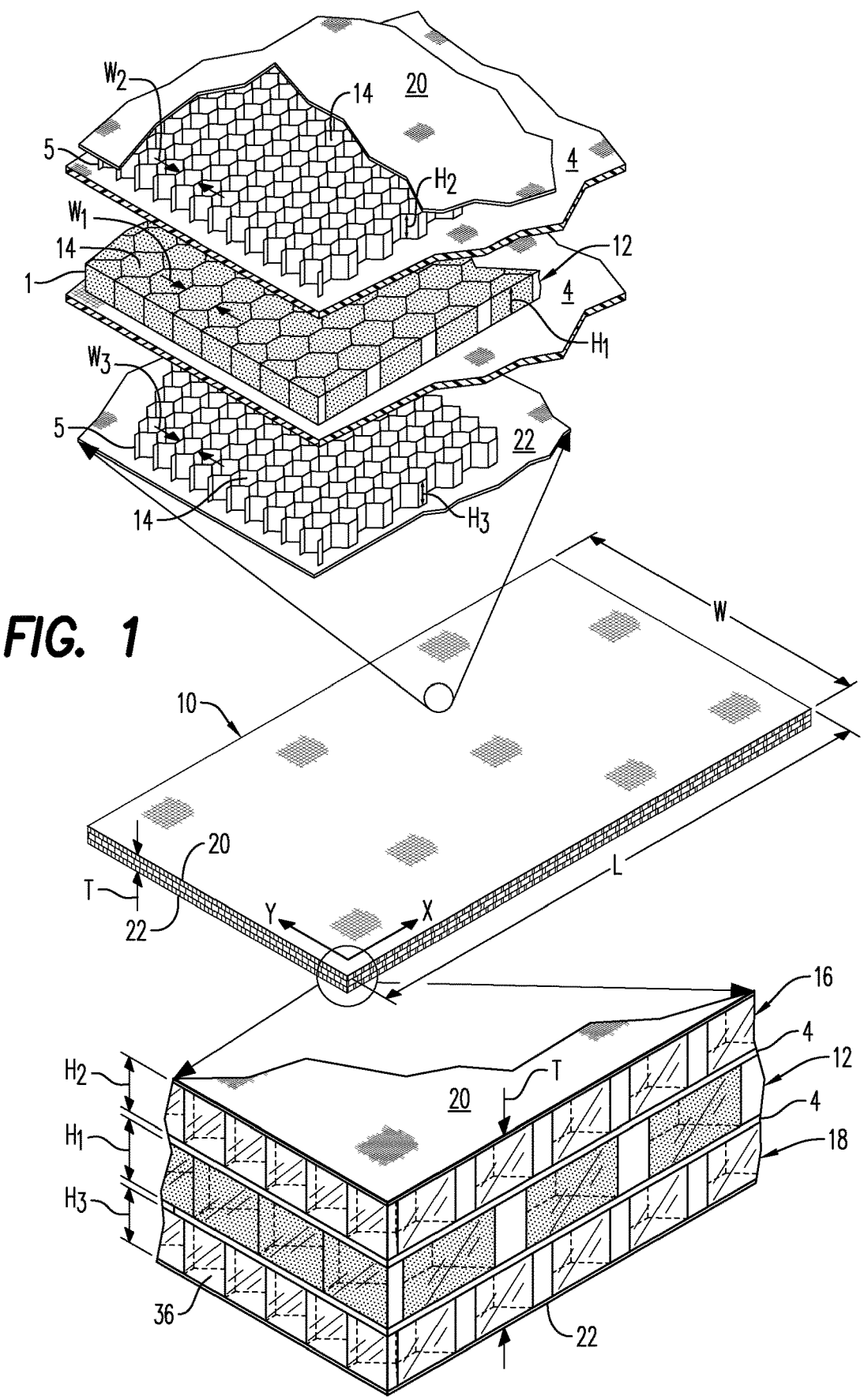
FIG. 1 is an exploded isometric view of an aircraft structural acoustic panel after fabrication thereof.

Illustrated in FIG. 1 is an exemplary aircraft acoustic structural panel 10 in final configuration following manufacture or fabrication thereof in accordance with an improved method disclosed hereinbelow.

The panel 10 is rectangular with a length L along the longitudinal axis X, and a width W along the transverse axis Y. The panel 10 is typically large with a length L of about 244 cm and a width W of about 122 cm, and may be specifically configured and sub-divided for various structural purposes in aircraft construction which typically requires high strength and structural rigidity with minimal weight.

In many aircraft-specific configurations disclosed above, noise or sound attenuation or abatement is also desired in the panel without substantially increasing its size, weight, or manufacturing costs.

Figure 4:
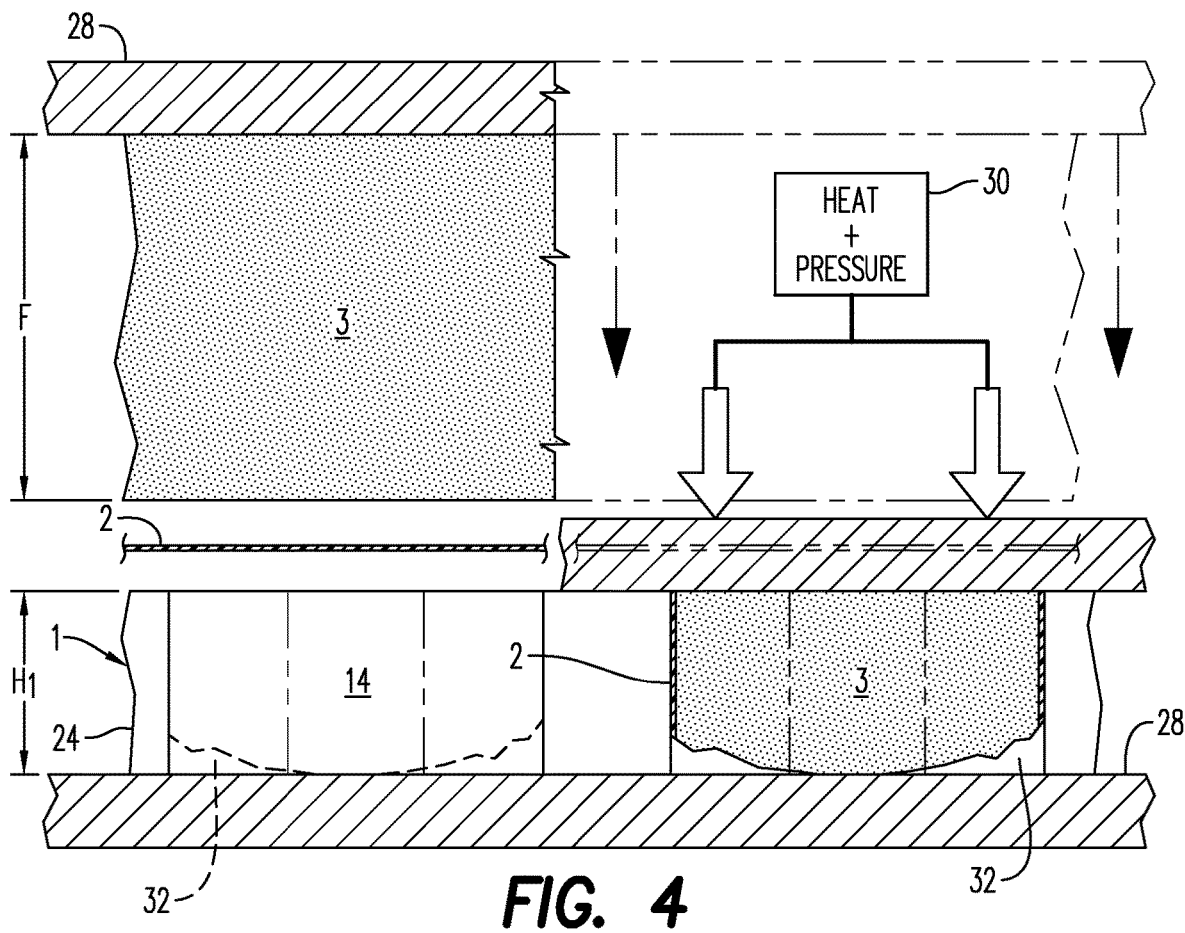
FIG. 4 is an elevational schematic view through the core honeycomb of FIG. 3, and taken along cut line 4-4, to schematically illustrate preforming the core honeycomb laminate with foam-filled honeycomb cells.

A significant feature in the panel 10 shown in FIG. 1 is its preformed center or core honeycomb laminate 12 having preformed acoustic foam 3 bonded inside hexagonal cells 14 thereof by a separate and distinct adhesive 2 (best shown in FIG. 4).

The preformed honeycomb laminate 12 is stacked vertically between opposite top and bottom structural outer laminates 16, 18 and suitably compressed together under heat and pressure into the final unitary structural panel 10 having the core honeycomb laminate 12 integrally bonded between outer and inner skins 20, 22.

Figure 2:
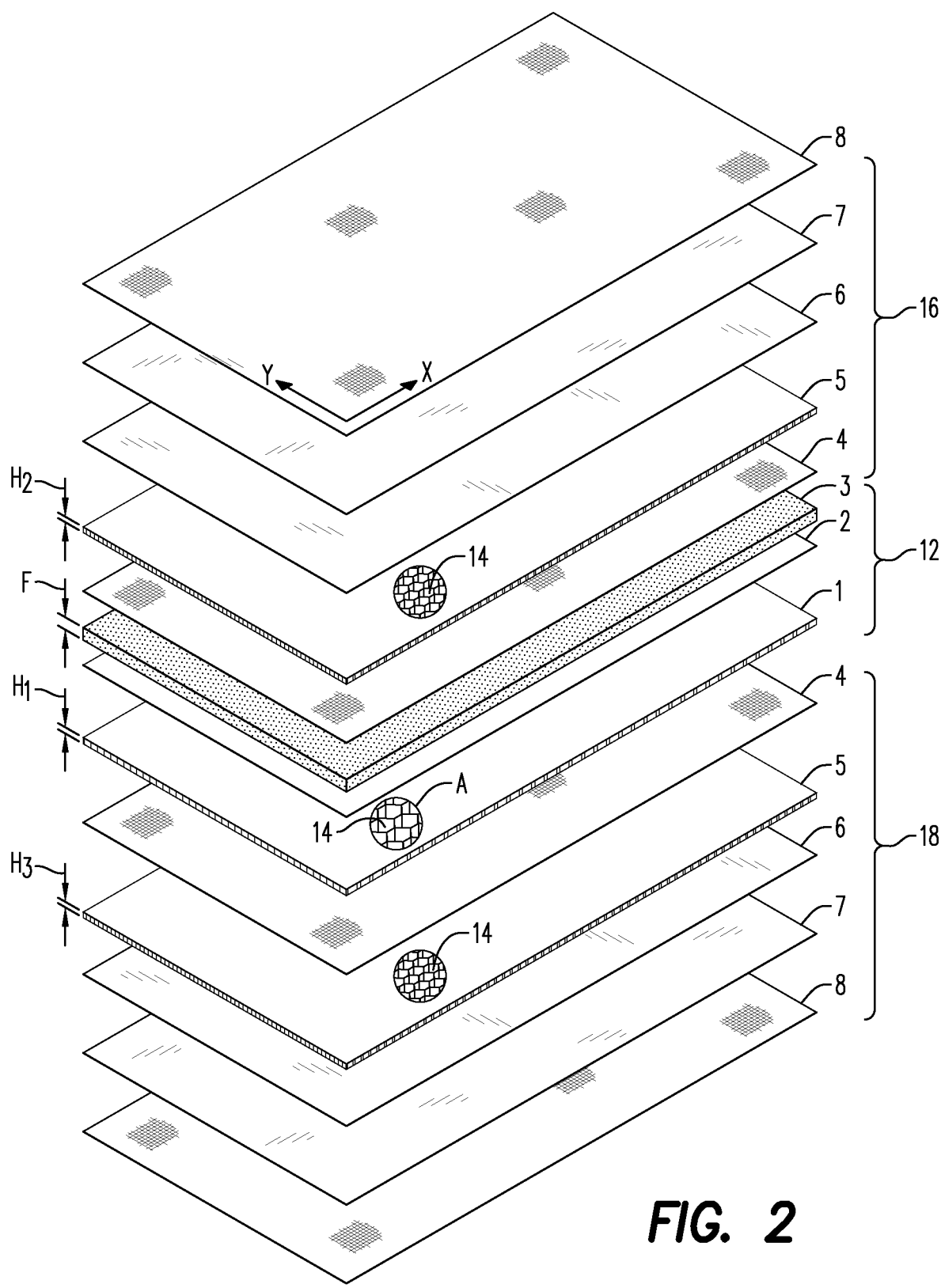
FIG. 2 is an exploded isometric view of the constituent components of the fabricated panel shown in FIG. 1.

FIG. 2 illustrates in exploded view the initial constituent elements or layers 1-8 arranged in a vertical stack to form the fabricated panel 10 shown in FIG. 1 in a preferred method of making or fabrication which initially includes suitably providing or supplying the preformed foam in a uniform foam layer 3.

The foam layer 3 is stacked atop a thermally curable adhesive film layer 2 and in turn also stacked atop a center or core honeycomb 1, and then suitably compressed together under pressure and heat to thermally bond the foam 3 inside the honeycomb cells 14 to preform the honeycomb laminate 12.

Figure 3:
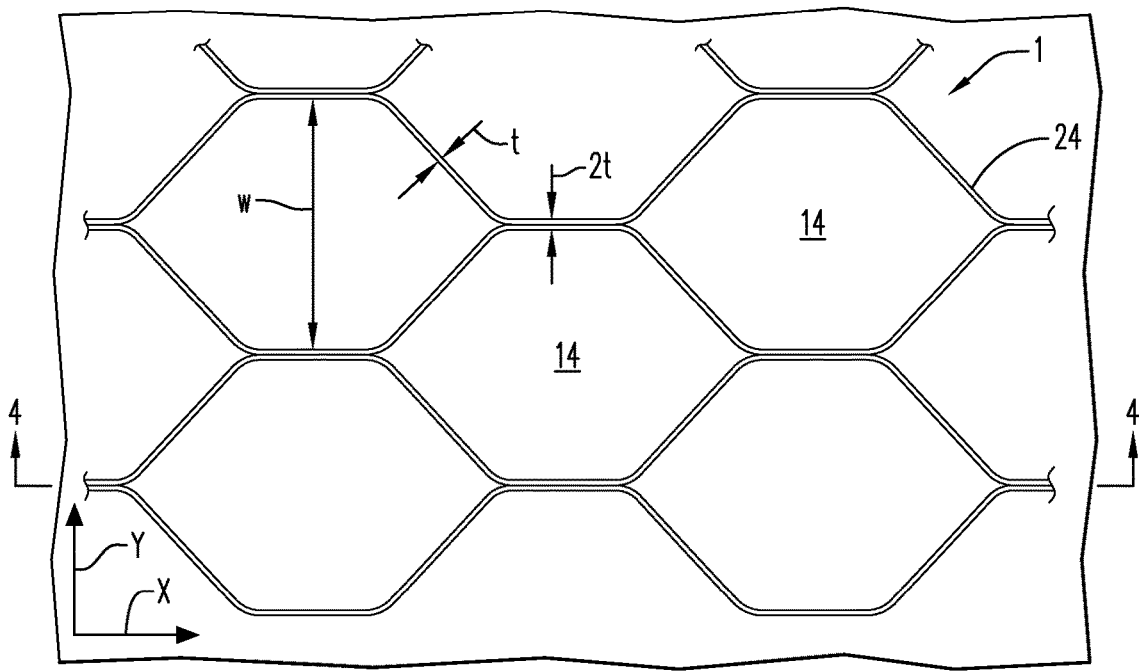
FIG. 3 is a plan view of a portion of the core honeycomb shown in FIG. 2 magnified within the circle labeled A in FIG. 2.

FIG. 3 shows a plan view of a representative portion of the center or middle honeycomb 1 within the middle magnifying circle labeled A in FIG. 2. This middle honeycomb 1 may have any conventional configuration and method of construction itself, along with the other two honeycombs 5 also shown in corresponding magnifying circles in FIG. 2. FIG. 4 shows an elevational view of the core honeycomb 1 shown in FIG. 3 along cut line 4-4.

In the exemplary configuration shown in FIGS. 3 and 4, the core honeycomb 1 is made from many thin strips 24 extending in serpentine fashion along the longitudinal axis X of the core honeycomb 1. The strips 24 have a height $H_1$ and a thickness t and define the sidewalls of the honeycomb cells 14.

The sidewall strips 24 are transversely spaced apart to define alternating hexagonal cells 14 suitably joined or bonded together at common sidewalls having a combined thickness of 2t.

Figure 5:
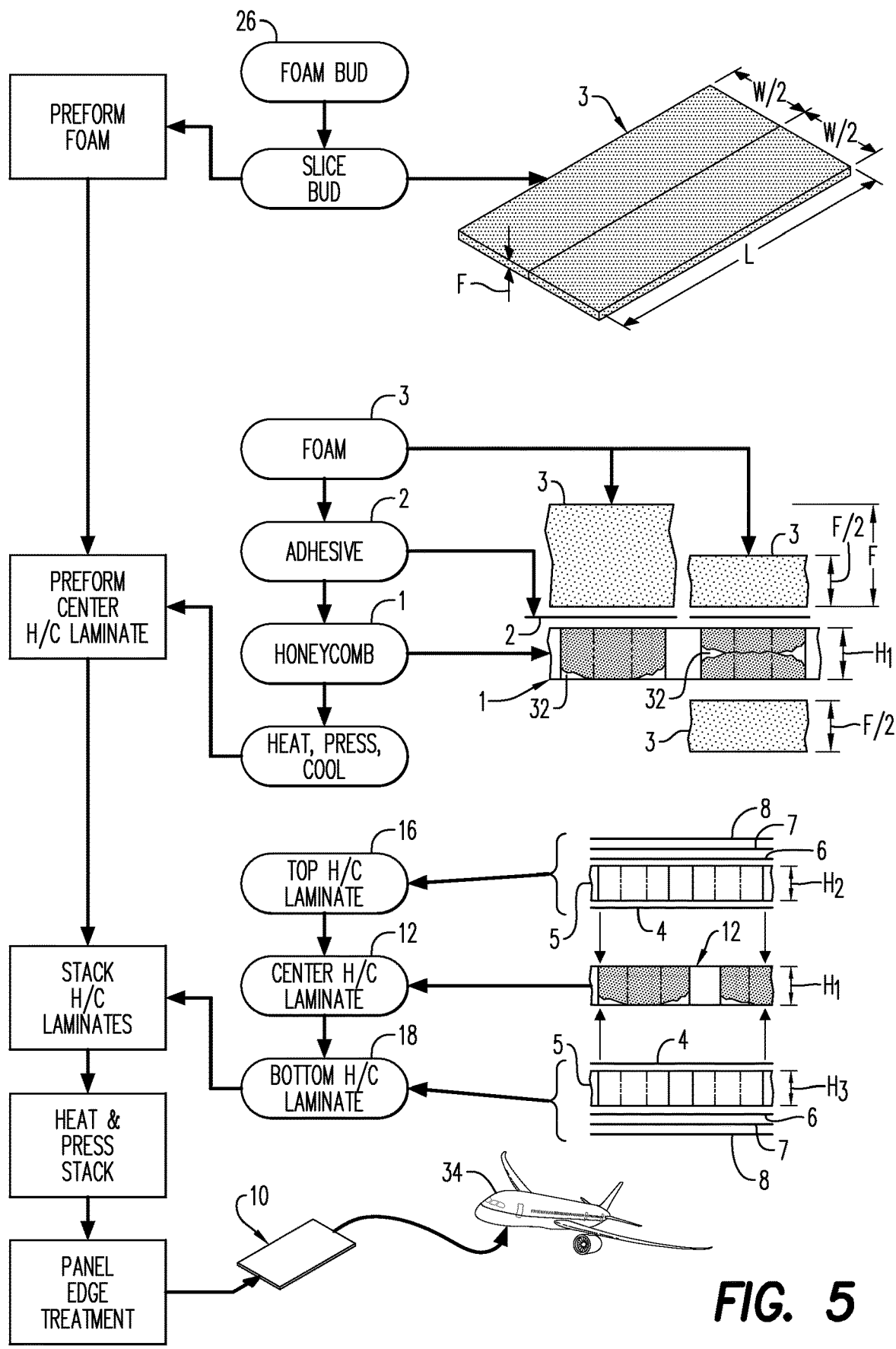
FIG. 5 is a flowchart of method features for fabricating the structural panel shown in the preceding figures.

FIG. 5 shows a flowchart of the exemplary method of fabrication commencing with preforming the acoustic foam layer 3. Foam products are ubiquitous and are typically made by a supplier using suitable liquid ingredients that undergo a chemical foaming reaction and expand into either open or closed cell foams.

This is shown schematically in FIG. 5 in which a foam bud 26 is made or grown, typically by a commercial supplier, and then that bud 26 is suitably sliced into uniform layers as desired for various products.

The acoustic foam layer 3 is preferably obtained in this way from a commercial supplier, instead of forming it de novo or in situ to ensure suitable material properties while minimizing complexity and cost of fabrication. One commercial supplier can provide the foam layer 3 with suitable uniform thickness F, and a length matching that of the desired panel, e.g. 244 cm, but with a width W/2 of about half the width W of the desired panel, e.g. about 61 cm, in which case the foam layer 3 may be preformed or supplied by using two commercially available half-strips (W/2) arranged side-by-side.

In the exemplary configuration shown in FIGS. 3 and 4, the honeycomb cells 14 have sharp edges at their open ends due to the thinness (t) thereof, which may be about 4 mils (0.102 mm), and the foam layer 3 and adhesive layer 2 are easily cut by the sharp edges as the foam layer 3 is compressed atop the honeycomb 1 to fill each initially empty cell 14 with a respective portion of the foam layer 3.

FIG. 4 illustrates schematically that the foam layer 3 may be stacked atop the adhesive layer 2 and in turn atop the core honeycomb 1 between a pair of pressing plates 28 in a conventional heating press 30. In a first pressing operation, the top plate 28 presses downwardly the foam layer 3 and adhesive layer 2 atop the sharp edges of the honeycomb cells 14 which cuts these two layers into corresponding plugs pressed into the corresponding cells 14.

In this way, the sharp honeycomb cells 14 cut the foam layer 3 in the fashion of an annular cookie cutter under suitable heating and compression to fill each cell 14 with a corresponding portion of the original foam layer, which is suitably bonded and sealed inside each cell 14 by respective portions of the adhesive layer 2.

The adhesive layer 2 is preferably provided in thin film form matching the total surface area of the rectangular core honeycomb 1 and foam layer 3, and the adhesive is also thermally setting. In this way, the foam 3 and adhesive 2 can be preferentially selected for ensuring that the sharp cells 14 can in fact cut the foam and adhesive into the corresponding foam plugs to fill each cell 14 under elevated temperature, without otherwise damaging or buckling the cells 14 or their thin and fragile sidewalls 24.

After pressing under heat, the so preformed core laminate 12 is allowed to cool to room temperature, with the thermally cured adhesive 2 securely bonding and sealing the foam plugs inside the multitude of honeycomb cells 14.

In the exemplary embodiment shown in FIG. 4, the preformed foam layer 3 has an initial thickness F about twice the height $H_1$ of the honeycomb cells 14 and is fully compressed into the cells 14, and retained therein by the adhesive 2.

The left side of FIG. 4 shows the initial foam layer 3 in full thickness F prior to compression atop the core honeycomb 1, and the right side of FIG. 4 shows the foam compressed fully into the corresponding cells 14, with portions of the adhesive 2 being spread downwardly along the sidewalls 24 to fixedly bond and seal the foam plugs in the corresponding cells 14.

In FIG. 4, the foam layer 3 is pressed into the core honeycomb 1 from one side only, and therefore is preferably suitably thicker than the height $H_1$ of the cells 14 to ensure that the cells 14 are sufficiently filled with acoustic foam substantially down to the bottom thereof. For example, the foam layer 3 is about twice as thick as the height of the cells 14.

In this way, the top press plate 28 ensures that the top of the foam is pressed substantially flush or even with the planar top surface of the cells 14, even after removal of the plate 28. The double-thickness of the initial foam layer 3 ensures that each of the honeycomb cells 14 is filled with foam substantially completely.

In one embodiment tested, the foam plugs substantially filled the cells about 80% to about 100% in view of the random nature of foam cutting over the multitude of cells 14 contained in the large core honeycomb 1, with the bottom of at least some of the cells having corresponding small voids 32 devoid of foam mostly around the perimeter of the hexagonal cell where sidewall friction prevents complete insertion of the foam to the bottom of the cells.

The resulting so preformed core honeycomb laminate 12 therefore includes foam 3, in plug form, securely adhesively bonded into each of the multitude of hexagonal cells 14 for providing effective acoustic or noise abatement or suppression. This configuration creates one form of muffler to dissipate acoustic energy or noise.

In a preferred configuration, the honeycomb 1 is metal, such as aluminum, with thin sidewalls 24 being sufficiently sharp to cut the foam layer 3 during the compression thereof.

Correspondingly, the preferred foam layer 3 is sufficiently soft for being readily cut by the honeycomb cells 14 during compression without damaging the honeycomb cells 14 or buckling the sidewalls 24 thereof.

FIG. 5 illustrates schematically this one-side-only pressing of the foam layer 3 into one side only of the core honeycomb 1.

However, FIG. 5 also illustrates schematically an alternate configuration in which two foam layers 3 are pressed into both sides of the core honeycomb 1.

In this configuration, the preformed foam layer 3 has an initial thickness F/2 equal to about the height $H_1$ of the honeycomb cells 14. Two of these thinner foam layers 3 are disposed on opposite sides of the honeycomb 1 in symmetrical mirror fashion. However, the adhesive layer 2 is preferably applied directly adjoining one side only, such as the top side, of the honeycomb 1 as shown schematically in FIG. 5.

Both of the foam layers 3 are then simultaneously compressed into the honeycomb cells 14 from opposite sides of the core honeycomb 1 to fill corresponding top and bottom halves of the cells 14. The single adhesive layer 2 is simultaneously compressed by the top foam layer 3 into the cells 14 where the adhesive coats the cell sidewalls 24 and additionally bonds together the two foam fronts as they are compressed to meet near the middle of each cell.

In this alternate configuration, both the top and bottom surfaces of the core honeycomb 1 have foam disposed flush or even therewith, with the top and bottom foam plugs being adhesively bonded into each cell 14. Yet again, small voids 32 devoid of foam may be randomly found at the middle perimeter of each cell where the opposite foam plugs adjoin each other.

The so configured core honeycomb laminate 12 accordingly includes specially fabricated and configured foam 3, in plug form, adhesively bonded therein to effect a noise attenuating muffler in the center or middle of the structural panel 10.

Cooperating with this foam-filled core honeycomb laminate 12 are the two outer laminates 16, 18 each specially configured to include an imperforate acoustic layer or septum 4 directly adjoining the preformed core honeycomb laminate 12 disposed inboard of the outer skins 20, 22 as shown in FIGS. 1 and 2.

The acoustic septums 4 bound or sandwich the foam-filled core honeycomb laminate 12 therebetween, and are rigid and imperforate to provide an additional form of sound suppression in the form of a reactive muffler that cooperates with the core honeycomb laminate 12 to collectively attenuate noise transmission from and through both sides of the core assembly.

This so-configured collective core assembly is rigid and also provides substantial strength for the finished structural panel 10, along with acoustic abatement.

Each of the two outer laminates 16, 18 preferably includes one imperforate acoustic septum 4 directly adjoining a corresponding opposite side of the preformed honeycomb laminate 12, followed by an outer or outboard honeycomb 5 directly adjoining the acoustic septum 4.

A plurality of directional structural fiber layers 6, 7, 8 adjoin the outer honeycomb 5 to define the outer skins 20, 22 which integrally bound the so laminated acoustic panel 10.

FIGS. 2 and 5 illustrate additional features of the fabrication process using the preformed core honeycomb laminate 12 for obtaining the final panel 10 having both structural rigidity and strength along with inherent acoustic performance for attenuating sound or noise.

Stacked atop opposite sides of the preformed honeycomb laminate 12 in turn are a prepreg epoxy-fiber septum 4, an outer honeycomb 5, and a plurality of prepreg epoxy directional structural fiber layers 6, 7, 8 to form a collective stack 12, 16, 18. Prepregs are conventional features in which material is pre-impregnated with suitable thermally curable resins, like common epoxy, which bonds together the fibers in a rigid resin matrix after heat curing.

This collective stack of individual components is then suitably compressed together under heat and pressure in a second press operation to thermally cure and form the unitary structural panel 10 having the preformed honeycomb laminate 12 bonded in the middle between the outer laminates 16, 18 each including a corresponding one of the outer honeycombs 5 bonded between the outer skins 20, 22.

The structural fiber prepreg layers 6, 7, 8 include a first unidirectional fiber layer 6 directly adjoining the outer honeycomb 5 followed in turn by a second unidirectional fiber layer 7 disposed transversely to the first unidirectional layer 6 and terminating in a woven fiber layer 8 exposed outboard.

As shown in FIGS. 1 and 2, the outer and inner laminates 16, 18 are preferably configured in identical, mirror-image sub-assemblies to similarly cooperate with the common center core honeycomb laminate 12 disposed therebetween.

The core honeycomb 1 includes hexagonal cells with height $H_1$ and width $W_1$. The top outer honeycomb 5 has height $H_2$ and cell width $W_2$. And, the bottom outer honeycomb 5 has height $H_3$ and cell width $W_3$.

The two outer honeycombs 5 are preferably identical in configuration with equal cell height and width.

But, in the preferred configuration, the core honeycomb 1 is made of metal, such as lightweight aluminum, and the outer honeycombs 5 are non-metal, such as Aramid fibers, and the honeycomb cells 14 of the former are larger than the cells of the latter, with the core honeycomb 1 being taller in height $H_1$ than the heights $H_2$ and $H_3$ of the outer honeycombs 5, with correspondingly wider cells 14 having $W_1$ being greater than $W_2$ and $W_3$.

The corresponding first directional layer 6 includes structural fibers, like strong carbon fibers, in tape form extending transversely along the Y-axis. The second directional layer 7 includes structural fibers, like strong carbon fibers, in tape form extending longitudinally along the X-axis. And, the outboard fiber layer 8 includes woven fibers, like fiberglass cloth, for both longitudinal and transverse strength.

Collectively, the three fiber layers 6, 7, 8 define respective ones of the outer and inner skins 20, 22, and along with the core honeycomb 1 and two outboard honeycombs 5 effect substantial rigidity and strength to the final structural panel 10.

And, equally significant is the acoustic abatement performance of the finished panel 10 due to this special assembly of acoustic and structural features which cooperate for both enhanced panel strength and acoustic attenuation performance.

Acoustic abatement panels are well known and typically include cavities for sound suppression. In this regard, conventional acoustic abatement panels typically include a multitude of perforations in the outer skins thereof, as well as internally.

In stark contrast with conventional perforated panels, the acoustic panel 10 disclosed herein preferably has imperforate outer skins 20, 22, and correspondingly imperforate structural fiber prepreg layers 6, 7, 8 bounding the two outer honeycombs 5.

It is possible that the outer skins 20, 22 could be perforated in alternate embodiments, but further sound attenuation therefrom must be confirmed by further development and testing.

As disclosed above, the outer laminates 16, 18 preferably have imperforate acoustic septums 4 directly adjoining the preformed honeycomb laminate 12 disposed inboard of the outer skins 20, 22. The outer honeycombs 5 directly adjoin the acoustic septums 4, and the directional structural fiber layers 6, 7, 8 define imperforate outer skins 20, 22.

The acoustic septums 4 cooperate with the core honeycomb laminate 12 for collectively attenuating sound, and that preformed laminate 12 includes foam 3 filling each of the honeycomb cells 14 substantially completely. In contrast, the cells 14 of the outer honeycombs 5 are preferably empty and devoid of any foam.

The special method of fabrication disclosed above results in a correspondingly special finished structural panel 10 made by such method.

FIG. 5 shows the special process steps in which the center honeycomb laminate 12 has preformed foam 3 compressed and bonded inside the cells 14 thereof by the distinct adhesive 2. The top and bottom structural outer laminates 16, 18 are integrally bonded to and sandwich the center honeycomb laminate 12 in the second heating and pressing operation.

The two imperforate acoustic septums 4 are thusly directly bonded to the opposite sides of the center honeycomb laminate 12, and the two outer honeycombs 5 are in turn directly bonded to the septums 4. The directional structural fiber layers 6, 7, 8 are integrally bonded to the outer honeycombs 5 to collectively define the top and bottom outer laminates 16, 18 having the outer skins 20, 22 integral therewith.

Accordingly, the acoustic structural panel 10 so fabricated undergoes two separate heating and pressing cycles, and the foam 3 plugging each of the core honeycomb cells 14 has a special configuration bonded to the inner surfaces of the cells by the separate and distinct adhesive 2 specifically provided for this purpose resulting in a unique collective Presented in the Table below are examples of exemplary materials which may be used in fabricating an effective acoustic structural panel 10 for aircraft configurations:

TABLE

| Layer | Thickness (inch/mm) | | Description |
|---|---|---|---|
| 8 | 0.00125 0.0317 | Prepreg-Epoxy/ Glass | Fiber Type: Woven Glass Fabric Style/Weight: plain/48 g/m$^2$ Resin % Weight: 40% |
| 7 | 0.00725 0.184 | Prepreg-Epoxy/ Carbon | Fiber Type: Unidirectional Carbon Fiber Weight: 200 g/m$^2$ Resin % Weight: 35% |
| 6 | 0.007 0.178 | Prepreg-Epoxy/ Carbon | Fiber Type: Unidirectional Carbon Fiber Weight: 180 g/m$^2$ Resin % Weight: 50% |
| 5 | 0.1095 2.78 | Nonmetallic Honeycomb | Fiber Type: Aramid Cell Size: 4.0 mm (5/32") Density: 72 kg/m$^3$ (4.5 lb/ft$^3$) Height ($H_2$): 2.82 mm |
| 4 | 0.0025 0.064 | Prepreg-Epoxy, Glass Fabric (Acoustic solution) | Fiber Type: Woven Glass Fabric Style/Weight: 120/107gsm Resin % Weight: 45% |
| 3 | 0.250/6.35 | Acoustic Foam (Acoustic solution) | Closed cell foam Density: 50 kg/m$^3$ (3.1 lb/ft$^3$) Thickness (F): 0.250 inches/6.35 mm |
| 2 | 0.002/0.051 | Epoxy Film Adhesive (Acoustic solution) | Density: 0.06 lb/ft$^3$ |
| 1 | 0.125 3.18 | Aluminum Honeycomb (Acoustic solution) | Cell Size: 6.35 mm (1/4") Density: 126 kg/m$^3$ (7.9 lb/ft$^3$) Height ($H_1$): 3.18 mm (0.125") |
| 4 | 0.0025 0.064 | Prepreg-Epoxy, Glass Fabric (Acoustic solution) | Fiber Type: Woven Glass Fabric Style/Weight: 120/107gsm Resin % Weight: 45% |
| 5 | 0.1095 2.78 | Nonmetallic Honeycomb | Fiber Type: Aramid Cell Size: 4.0 mm (5/32") Density: 72 kg/m$^3$ (4.5 lb/ft$^3$) Height ($H_3$): 2.82 mm |
| 6 | 0.007 0.178 | Prepreg-Epoxy/ Carbon | Fiber Type: Unidirectional Carbon Fiber Weight: 180 g/m$^2$ Resin % Weight: 50% |
| 7 | 0.00725 0.184 | Prepreg-Epoxy/ Carbon | Fiber Type: Unidirectional Carbon Fiber Weight: 200 g/m$^2$ Resin % Weight: 35% |
| 8 | 0.00125 0.0317 | Prepreg-Epoxy/ Glass | Fiber Type: Woven Glass Fabric Style/Weight: plain/48 g/m$^2$ Resin % Weight: 40% |
| Total Thickness (T) | 0.382 inches (9.7 mm) | | Estimated 0.71 lb/ft2 Weight (3.5 kg/m2) | configuration tested in development to have significant sound attenuation performance.

FIG. 5 additionally illustrates that the so-configured acoustic structural panel 10 may undergo post-processing fabrication as desired for obtaining suitable configurations for various uses in the typical commercial aircraft 34.

For example, since the perimeter of the rectangular panel 10 necessarily includes only portions of complete honeycomb cells, as shown in FIG. 1, a suitable edge treatment may be used to fill the incomplete edge cells with a suitable material or resin 36, which may be suitably hardened to form a plain perimeter and avoid sharp edges therealong.

The preformed core honeycomb laminate 12 disclosed above cooperates in the finished panel 10 to collectively provide therewith both substantial rigidity and strength, along with demonstrated sound attenuation or abatement in a configuration built and tested.

Various modifications of the significant features disclosed above may be pursued through development testing to obtain a final panel having the preformed acoustic foam specially pressed therein without damaging or buckling the lightweight core honeycomb 1 itself.

In the Table presented above, the various layers are common products commercially available from various sources in the U.S.A. and abroad, in a multitude of material configurations having correspondingly different thermally curing cycles. And, all layers are provided in suitable form and size to cover the entire surface area across the desired length L and width W of the final panel 10.

In the preferred configuration, the core honeycomb 1 is entirely aluminum metal with sidewall thickness t of about 0.102 mm for maintaining light weight, while presenting sharp cutting edges for the acoustic foam 3.

The acoustic foam 3 must be sufficiently soft for being cut by the honeycomb cells 14 during fabrication without damaging or buckling the cell sidewalls 24.

In one configuration built and tested, the acoustic foam 3 comprises a polyethersulphone-based foamed core material made from a thermoplastic resin from the BASF Corporation, Florham Park, N.J., U.S.A.; and commercially available under the trademark Divinycell® F-50 from the Diab Group, Laholm, Sweden.

This F-50 foam material was successfully cut by the aluminum honeycomb cells during the first compression operation without any damage or buckling to the cells.

However, another commercially available H-series variation of this foam material was also tested but was too strong and caused unsatisfactory buckling damage to the thin aluminum cell walls.

The outer non-metallic honeycombs 5 are preferably made of conventional Aramid fiber, and commercially available from various sources.

The remaining fiber, glass, and adhesive materials are also commercially available in various forms from various sources. Both the fiberglass woven layers 4, 8 and the unidirectional carbon fiber tape layers 6, 7 are preimpregnated with thermally curable epoxy resins which are thermally cured under the heating and pressing cycles to bind together all layers in a unitary finished structural panel having substantial strength and rigidity.

In the Example presented in the above Table, the two outer honeycombs 5 may be made from Kevlar® N636 para-aramid fiber commercially available from Plascore Incorporated, Zeeland, Mich., U.S.A.

These two nonmetallic honeycombs 5 have a density of 72 kg/m$^3$ for collectively achieving in the finished panel 10 a suitable rigidity and strength for an aircraft cabin floor application.

Two other examples considered were identical to the Table Example except that the two Aramid honeycombs 5 had higher densities of 96 and 123 kg/m$^3$ for further increasing panel rigidity and strength.

The core layers 1, 2, 3 and two bounding septum layers 4 have been specifically annotated in the Table for their special contribution to achieving the acoustic solution or noise suppression in the finished panel 10.

The improved panel design disclosed above integrally includes acoustic reduction properties based on the combination of multiple materials and distinct layers in the middle core subassembly. Core materials include honeycomb, fiberglass preimpregnated plies, film adhesive and foam. The manufacturing process to achieve the acoustic performance improvements divides the core assembly into preferably three layers which collectively act as noise isolators.

Driving the acoustic abatement improvement to the interior of the panel will reduce the need for secondary materials, thusly saving weight, and can reduce overall noise levels and increase passenger comfort.

The outer two layers bounding the core subassembly may be made from Aramid honeycomb core with a fiberglass prepreg septum bonded to the inner surface of the layer. The center layer of the core subassembly is preferably made from a combination acoustic foam being pressed into the cells of an aluminum honeycomb with an adhesive. A thicker layer of foam core as compared with the aluminum core is used to expand within cell walls and minimize edge gaps within the foam-to-cell wall contact area. This core assembly contains fiberglass ply septums acting as reactive muffler and the foam core acting as a dissipative muffler. The combination of both techniques is utilized to achieve acoustic attenuation or abatement.

The overall panel thickness may be unaffected when compared with traditional panel construction, and total aircraft weight impact is likely lighter than using secondary bonding of external sound abatement materials. The panel will maintain the strength properties of conventional sandwich panels.

The laminated composite sandwich panel 10 accordingly includes an internal acoustic abatement core assembly integrated with outer and inner panel skins into a standard panel construction for corresponding use in any structural panel applications, including, in particular, aircraft construction.

The panel skins and the core layers can be sized to adjust for panel thickness, panel strength, or weight optimization. The acoustic core subassembly can be used on contoured panels as well as flat panels.

Layers 6, 7, 8 collectively define the first and second or outer and inner laminated skins, which can be separately configured as required for various structural applications.

Layers 4, 5 define corresponding non-metallic honeycomb layers adhesively bonded integrally into the composite panel, with layers 5 defining sound attenuating septums.

Layers 1, 2, 3 are preformed to define the center core subassembly for internally introducing acoustic abatement or sound attenuation within the composite panel itself for substantially reducing sound transmission therethrough; and in combination with the bounding layers effectively dissipate noise or sound energy.

The combination of multiple septums 4 in exemplary embodiments for capturing sound internally within the sandwich panel itself, and using a dissipative material 3 is believed to create a sound absorption level beyond the sum of individual sound abatement techniques independently.

Internal sound dampening allows for noise abatement to be included in common aircraft components which otherwise have limited noise absorption opportunities or capabilities.

Layer 1 is the metallic, or aluminum, honeycomb sheet into which is pressed the acoustic foam material 3 atop the intervening adhesive film layer 2, which bonds the foam into each honeycomb cell under suitable processing heat to form an integrated foam-filled acoustic core subassembly 1-2-3.

Panel thickness, honeycomb configurations, and skin materials are customizable to meet strength, rigidity, and load requirements.

Specific sound frequency abatement may be customized by modifying configuration and material composition of the three honeycombs 1, 5, 5; acoustic foam 3, and adhesive layer 2; along with modifying configuration, plies, size, material, and orientation of fibers in the exemplary structural layers 4, 6, 7, 8.

Furthermore, the acoustic panel 10 could be even further modified to include additional conventional noise abatement features provided that these additional features do not degrade acoustic abatement performance of the resulting panel.

Further testing would be required to develop how best to implement sound abatement in various configurations for different structural applications in aircraft, or any other application in which noise abatement is desired.

A typical aircraft includes various structural panels which may be modified herein for effecting significant sound attenuation, such as, for example, lavatory walls, stowage bins, floorboards, and additionally:

Floorboards to reduce aircraft mechanical systems noises to the cabin;

Cabin liner panels to minimize external to aircraft sounds;

Equipment racks and cockpit instrument panel to contain electronic noises; and

Cabinets, galleys, and lavatory walls to provide interior sound dampening of plumbing systems.

Exemplary benefits from the improved acoustic structural panel 10 include:

Combining two types of sound attenuation within a compact space and maintaining mechanical strength properties;

Potentially lighter panel compared with typical construction that requires external sound abatement materials;

Does not require skin perforation to attain sound absorption; prevents moisture or other contaminants from the panel;

Capable of flush mounting alongside other non-acoustic treated panels without need to accommodate secondary materials;

Panel design does not preclude the use of existing techniques for sound abatement;

This design does not add any complexity to the end use of the panel installation into cabinets, floorboards, or other products; and The same processes and techniques, or various conventional manufacturing processes, can still be utilized to implement the improved acoustic abatement panel design.

Acoustic properties may be tunable for desired sound frequencies by material selections and sizing. Examples are cell sizes, material densities, and material types. Further testing will determine effectiveness of acoustic abatement, but the basic layer design need not change.

Accordingly, the acoustic abatement laminated panel 10 disclosed above can have various configurations, with various layers, and various materials, and various dimensions and thicknesses for providing internal sound abatement by the special combination of layers and materials thereof.

Different features may be varied for varying acoustic abatement, while also providing desired structural strength of the panel for its intended application.

The center acoustic core may be configured and varied for tailoring either or both of the reactive muffler or the dissipative muffler performance thereof for maximizing noise abatement performance, with or without additional conventional noise abatement features.

The outer and inner skins of the panel are preferably imperforate; but could be otherwise configured as desired provided they do not adversely affect strength of the panel, or the internal noise abatement performance thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

The invention claimed is:

1. An aircraft acoustic structural panel (10) made by the method comprising:
compressing together under pressure and heat a stack including a preformed uniform foam layer (3), a layer of adhesive (2), and a core honeycomb (1) having a plurality of honeycomb cells (14) and thereby pressing said preformed uniform foam layer (3) substantially flush atop said core honeycomb (1) to form corresponding foam plugs from said preformed uniform foam layer (3) being thermally bonded inside said honeycomb cells (14) by said adhesive (2), with said preformed uniform foam layer (3) being initially thicker than said core honeycomb (1) and fully compressed into said honeycomb cells (14) to preform a core honeycomb laminate (12);
stacking said preformed core honeycomb laminate (12) between opposite top and bottom structural outer laminates (16, 18) having corresponding outer skins (20, 22); and
compressing together under heat and pressure said stacked preformed core honeycomb laminate (12) and said structural outer laminates (16, 18) into a unitary structural panel (10) defining said aircraft acoustic structural panel having said preformed core honeycomb laminate (12) integrally bonded between said outer skins (20, 22).

2. An aircraft acoustic structural panel (10) made by the method comprising:
supplying preformed foam in a uniform foam layer (3);
stacking said preformed uniform foam layer (3) atop an adhesive layer (2) and in turn atop a core honeycomb (1) having a plurality of honeycomb cells (14), with said preformed uniform foam layer (3) being thicker than said core honeycomb (1); and
compressing together said stacked preformed uniform foam layer (3), adhesive layer (2), and core honeycomb (1) under pressure and heat to press said preformed uniform foam layer (3) substantially flush atop said core honeycomb (1) to form corresponding foam plugs from said preformed uniform foam layer (3) having reduced thickness inside said honeycomb cells (14), and thermally bond said foam plugs inside said honeycomb cells (14) to preform a core honeycomb laminate (12);
stacking said preformed core honeycomb laminate (12) between opposite top and bottom structural outer laminates (10, 18) having corresponding outer skins (20, 22); and
compressing together under heat and pressure said stacked core honeycomb laminate (12) and structural outer laminates (16, 18) into a unitary structural panel (10) defining said aircraft acoustic structural panel having said core honeycomb laminate (12) integrally bonded between said outer skins (20, 22).

3. The panel according to claim 2 wherein said structural outer laminates (16, 18) comprise an imperforate acoustic septum (4) directly adjoining said preformed core honeycomb laminate (12) and disposed inboard of said outer skins (20, 22).

4. The panel according to claim 3 wherein each of said structural outer laminates (16, 18) comprises:
said imperforate acoustic septum (4) directly adjoining a corresponding opposite side of said preformed core honeycomb laminate (12);
an outer honeycomb (5) directly adjoining said imperforate acoustic septum (4); and
a plurality of directional structural fiber layers (6, 7, 8) defining said outer skins (20, 22).

5. The panel according to claim 2 wherein said stacking and compressing of said preformed core honeycomb laminate (12) between said top and bottom structural outer laminates (16, 18) further comprises:
stacking atop opposite sides of said preformed core honeycomb laminate (12) in turn a prepreg epoxy-fiber septum (4), an outer honeycomb (5), and a plurality of prepreg epoxy directional structural fiber layers (6, 7, 8) to form a collective stack; and
compressing together under heat and pressure said collective stack to cure and form said unitary structural panel (10) having said preformed core honeycomb laminate (12) bonded in the middle between said structural outer laminates (16, 18) each including a corresponding one of said outer honeycombs (5) bonded between said outer skins (20, 22).

6. The panel according to claim 5 wherein said prepreg epoxy directional structural fiber layers (6, 7, 8) comprise a first unidirectional fiber layer (6) directly adjoining said outer honeycomb (5) followed in turn by a second unidirectional fiber layer (7) disposed transversely to said first unidirectional layer (6) and terminating in a woven fiber layer (8) exposed outboard.

7. The panel according to claim 5 wherein said prepreg epoxy structural fiber layers (6, 7, 8) are imperforate to collectively form the outer skins (20, 22) as imperforate outer skins (20, 22).

8. The panel according to claim 2 wherein said honeycomb cells (14) have sharp edges and said preformed uniform foam layer (3) and adhesive layer (2) are cut by said sharp edges as said preformed uniform foam layer (3) is compressed atop said core honeycomb (1) to fill each cell (14) said foam plugs.

9. The panel according to claim 8 wherein said preformed uniform foam layer (3) has an initial thickness (F) about twice the height ($H_1$) of said honeycomb cells (14) and is fully compressed into said cells (14), and retained therein by said adhesive.

10. The panel according to claim 8 wherein said core honeycomb (1) is metal with thin sidewalls (24) being sufficiently sharp to cut said preformed uniform foam layer (3) during said compression.

11. The panel according to claim 10 wherein said preformed uniform foam layer (3) is sufficiently soft for being cut by said honeycomb cells (14) during said compression without damaging said honeycomb cells (14).

12. The panel according to claim 8 wherein:
said preformed uniform foam layer (3) comprises two preformed uniform foam layers (3) each having an initial thickness (F/2) about the height ($H_1$) of said honeycomb cells (14);
said two preformed uniform foam layers (3) are disposed on opposite sides of said core honeycomb (1) with said adhesive layer (2) directly adjoining said core honeycomb (1) under only one of said foam layers (3); and
said two preformed uniform foam layers (3) are compressed into said honeycomb cells (14) from opposite sides of said core honeycomb (1) to fill corresponding halves of said honeycomb cells (14).

13. The panel according to claim 2 wherein said structural outer laminates (16, 18) comprise:
an imperforate acoustic septum (4) directly adjoining said preformed core honeycomb laminate (12) disposed inboard of said outer skins (20, 22);
an outer honeycomb (5) directly adjoining said imperforate acoustic septum (4); and
a plurality of directional structural fiber layers (6, 7, 8) defining said outer skins (20, 22).

14. The panel according to claim 13 wherein:
said preformed core honeycomb laminate (12) includes said preformed uniform foam layer (3) filling each of said honeycomb cells (14) substantially completely with said foam plugs, with at least some of said honeycomb cells having voids (32) devoid of foam below said foam plugs; and
said outer honeycomb (5) includes empty cells.

15. The panel according to claim 14 wherein said outer skins (20, 22) are imperforate.

16. An aircraft structural panel (10) comprising:
a preformed center honeycomb laminate (12) made by supplying preformed foam in a uniform foam layer (3), and then stacking said preformed uniform foam layer (3) atop an adhesive layer (2) and in turn atop a center honeycomb (1) having a plurality of honeycomb cells (14), with said preformed uniform foam layer (3) being thicker than said center honeycomb (1);
and compressing together said stacked preformed uniform foam layer (3), said adhesive layer (2), and said center honeycomb (1) under pressure and heat to press said preformed uniform foam layer (3) substantially flush atop said center honeycomb (1) to form corresponding foam plugs from said preformed uniform foam layer having reduced thickness inside said honeycomb cells (14), and thermally bond said foam plugs inside said honeycomb cells (14) to preform said center honeycomb laminate (12);
top and bottom structural outer laminates (16, 18) integrally bonded to corresponding opposite sides of said center honeycomb laminate (12), with each structural outer laminate (16, 18) comprising:
an imperforate acoustic septum (4) directly bonded to a corresponding side of said center honeycomb laminate (12);
an outer honeycomb (5) directly bonded to a corresponding one of said imperforate acoustic septums (4); and
a plurality of directional structural fiber layers (6, 7, 8) integrally bonded to corresponding ones of said outer honeycombs (5) to collectively define said top and bottom structural outer laminates (16, 18) having outer skins (20, 22) integral therewith.

17. The panel according to claim 16 wherein:
said adhesive layer (2) bonds said foam plugs inside each of said honeycomb cells (14); and
said imperforate acoustic septums (4) and plurality of directional structural fiber layers (6, 7, 8) include prepreg epoxy thermally cured to integrally bond together said preformed center honeycomb laminate (12) between said outer laminates (16, 18) in a unitary aircraft structural panel (10).

18. The panel according to claim 17 wherein:
said foam plugs substantially fill said honeycomb cells (14) of said center honeycomb laminate (12) to provide acoustic abatement;
said outer honeycombs (5) have empty honeycomb cells; and
said outer skins (20, 22) are imperforate.

19. The panel according to claim 17 wherein:
said preformed center honeycomb laminate (12) includes said foam plugs filling each of said honeycomb cells (14) substantially completely with at least some of said honeycomb cells having voids (32) devoid of foam below said foam plugs; and
said outer honeycombs (5) include empty honeycomb cells.

20. The panel according to claim 19 wherein:
said center honeycomb (1) comprises metal;
said outer honeycombs (5) comprise non-metal; and
said center honeycomb (1) is taller than said outer honeycombs (5), with correspondingly wider cells (14).

* * * * *